Nov. 29, 1955

W. F. HORTON 2,725,515

VOLTAGE REFERENCE DEVICE

Filed Jan. 12, 1952

Freq. of Voltage across Terminals 20 and 22

Frequency of Voltage $V_1$

Freq. of Voltage across Terminals 20 and 22

WITNESSES:
John E. Healy
K. W. Thomas

INVENTOR
William F. Horton
BY
Ezra W. Savage
ATTORNEY

Nov. 29, 1955  W. F. HORTON  2,725,515
VOLTAGE REFERENCE DEVICE
Filed Jan. 12, 1952  2 Sheets-Sheet 2

WITNESSES:
John E. Hensley
K. W. Thomas

INVENTOR
William F. Horton
BY
Ezra N. Savage
ATTORNEY

United States Patent Office 2,725,515
Patented Nov. 29, 1955

2,725,515

VOLTAGE REFERENCE DEVICE

William F. Horton, Pittsburgh, Pa., assignor to Westinghouse Electric Corporation, East Pittsburgh, Pa., a corporation of Pennsylvania Application January 12, 1952, Serial No. 266,205

6 Claims. (Cl. 321—19)

This invention relates to voltage reference devices and in particular to such devices employing static components.

Many types of electronic voltage reference devices have heretofore been utilized, however, such electronic devices have several disadvantages. For instance, the component parts of such electronic devices have to be replaced periodically, thus interrupting service furnished by other apparatus associated therewith. In addition, the original cost of electronic voltage reference devices is relatively high.

Various types of static voltage reference devices have also been utilized heretofore. However, these prior art static devices are not nearly as accurate as the electronic voltage reference devices. Therefore, it is desirable to have a highly accurate voltage reference device which comprises static components.

An object of this invention is to provide, in a voltage reference device, for combining the secondary voltage of a saturating transformer connected to the input of the voltage reference device with a voltage that decreases with an increase in the frequency of the secondary voltage to thus produce a substantially constant output voltage from the voltage reference device irrespective of the frequency of its input voltage.

Another object of this invention is to provide, in a voltage reference device, for combining the secondary voltage of a saturating transformer connected to the input of the device with a voltage that decreases with an increase in the frequency of the secondary voltage to thus obtain a resultant voltage and for combining a measure of the device's input voltage in phase opposition with a measure of said resultant voltage, to thus produce an output voltage for said device which is substantially independent of the magnitude and frequency of its input voltage.

A further object of this invention is to provide, in a voltage reference device, for combining the secondary voltage of a saturating transformer connected to the input of the device with a voltage that decreases with an increase in the frequency of the secondary voltage and then rectifying the currents produced thereby to thus obtain a resultant direct current voltage and for combining a measure of the device's input voltage once it has been rectified in phase opposition with said resultant voltage, to thus produce an output voltage for said device which is substantially independent of the magnitude and frequency of its input voltage.

Other objects of this invention will become apparent from the following description, when taken in conjunction with the accompanying drawings, in which:

Fig. 1b is a schematic diagram of a frequency sensitive network which comprises one component of the apparatus of Fig. 1a;

Figure 1A:
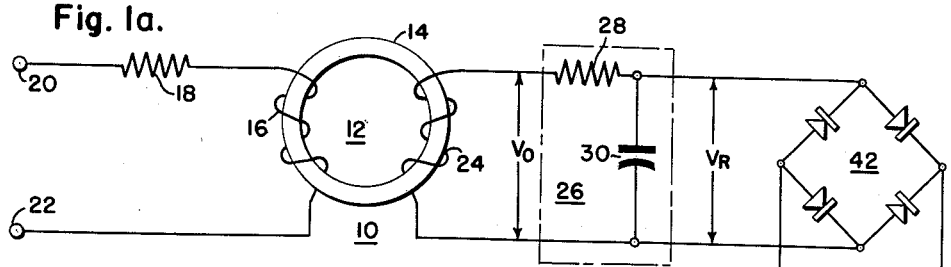
Figure 1a is a schematic diagram of circuits and apparatus illustrating an embodiment of the teachings of this invention.

Referring now to Fig. 1a of the drawings, a voltage reference device 10 illustrated comprises a saturating transformer 12, having a magnetic core member 14, preferably formed from square loop core material. In order to magnetically saturate the core member 14 in accordance with the input voltage of the voltage reference device 10, a primary winding 16 is disposed in inductive relationship with the core member 14. In this instance, the primary winding 16 is connected in series circuit relationship with a resistance member 18, the series circuit being electrically connected across input terminals 20 and 22. The input terminals 20 and 22 are supplied with a suitable alternating current voltage of variable frequency and magnitude, the voltage always being of sufficient magnitude to effect a substantially complete saturation of the magnetic core member 14.

When the voltage across the input terminals 20 and 22 is of such magnitude as to effect a substantially complete saturation of the core member 14, the impedance of the primary winding 16 is extremely low. Therefore, it is necessary that the resistance member 18 be connected in series circuit relation therewith, in order to limit the magnitude of the current flow through the primary winding 16 and thus prevent excess heating and resulting damage to the winding.

In order to produce an output voltage from the saturating transformer 12, which is substantially independent of the magnitude of the input voltage across the input terminals 20 and 22, a secondary winding 24 is disposed in inductive relationship with the magnetic core member 14. The reason the output voltage across the secondary winding 24 is substantially constant irrespective of the magnitude of the voltage across the terminals 20 and 22, is that the input voltage is always of such magnitude as to effect a substantially complete saturation of the core member 14. This can be better understood by considering that it takes a predetermined number of volt seconds to saturate the core member 14, and if the input voltage increases, the core member 14 will saturate within a predetermined time interval which will be of shorter duration than in the case when the input voltage is of lesser magnitude. Further, the areas under the voltage-time curves for the primary winding 16 are of substantially equal magnitude irrespective of the magnitude of the voltage across the terminals 20 and 22, since the same predetermined volt seconds are required to saturate the core member 14 each time. Therefore, since there is always a substantially complete saturation of the core member 14 for all magnitudes of voltage across the terminals 20 and 22, the impedance of the secondary winding 24 and thus the voltage thereacross remains substantially constant for varying magnitudes of voltage across the terminals 20 and 22. However, even though the output voltage across the secondary winding 24 is substantially constant irrespective of the magnitude of the voltage across the input terminals 20 and 22, still the magnitude of the voltage across the secondary winding 24 does vary with changes in the frequency of the voltage across the terminals 20 and 22 unless compensating means is provided.

In order to compensate for the changes in voltage across the secondary winding 24, due to changes in the frequency of the voltage across the terminals 20 and 22, a frequency sensitive network or frequency attenuation circuit 26 is provided. In this instance, the frequency sensitive network 26 comprises a resistance member 28 and a capacitor 30, and it is disposed to be responsive to the voltage across the secondary winding 24 of the saturating transformer 12. As illustrated, one terminal of the capacitor 30 is electrically connected to one terminal of the secondary winding 24 while the other terminal of the winding 24 is electrically connected to the other terminal of the capacitor 30 through the resistance member 28.

Figure 1B:
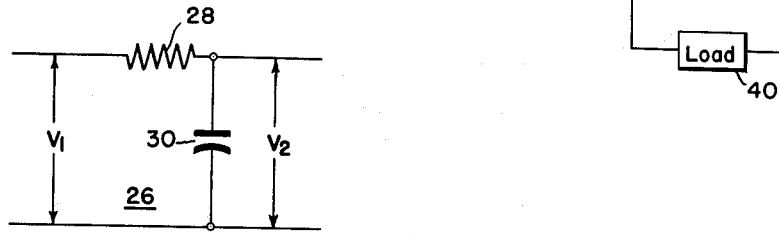

Referring now to Fig. 1b the frequency sensitive network 26 when considered as a separate unit produces a voltage $V_2$ at its output terminals that decreases with an increase in the frequency of the voltage $V_1$ impressed across its input terminals. This can be better understood by considering that the magnitude of the current flow through the capacitor 30 equals $$\frac{V_1}{R+\frac{1}{j\omega c}}$$

Such being the case $$V_2 \approx \frac{1}{j\omega c}\left(\frac{V_1}{R+\frac{1}{j\omega c}}\right)$$

$$V_2 \approx \frac{V_1}{j\omega cR+1} \approx \frac{V_1}{j\omega cR} \text{ provided } \omega Rc \gg 1$$

where R represents the ohmic resistance value for the resistance member 28, where $\omega$ represents $2\pi$ times the magnitude of the frequency of the voltage $V_1$, and where $c$ represents the value of the capacitor 30 in farads. It is to be understood that the above equations are approximations since they are predicated on sinusoidal wave shapes, the voltage $V_0$ across the secondary winding 24 not being of sinusoidal wave shape.

Figure 2A:
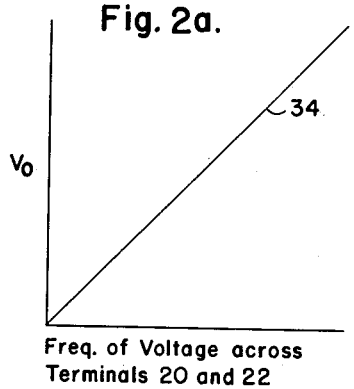
Figs. 2a, 2b and 2c are graphs representing the manner in which the voltage at different points in the apparatus of Fig. 1a varies with changes in the frequency of the input voltage to the apparatus.
Figure 2B:
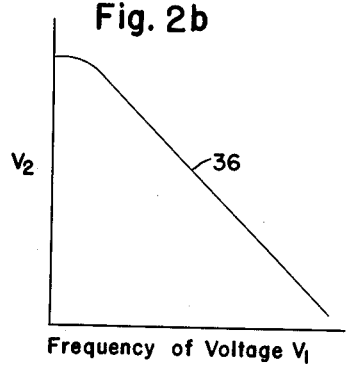
Figure 2C:
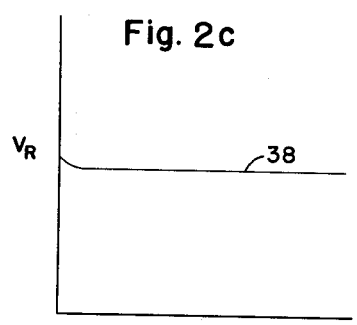

Referring to Fig. 2a there is illustrated a graph having a curve 34 which represents the manner in which the voltage across the secondary winding 24, as represented by $V_0$, varies with changes in the frequency of the input voltage across the terminals 20 and 22. As can be seen from curve 34, the voltage $V_0$ increases at a predetermined rate as the frequency of the voltage across the terminals 20 and 22 increases. On the other hand, as represented by curve 36 of Fig. 2b, the output voltage $V_2$ of the frequency sensitive network when considered as a separate unit decreases with an increase of the frequency of its input voltage $V_1$, the rate of increase and decrease for the curves 34 and 36, respectively, being identical. When the curves 34 and 36 are combined so as to represent the output voltage $V_r$ of the frequency sensitive network 26 when connected in the circuit, a horizontal curve 38, as represented in Fig. 2c is obtained. Thus the voltage $V_r$ remains substantially constant irrespective of the frequency of the input voltage across the terminals 20 and 22.

In order to rectify the output current from the frequency sensitive network 26 and produce a direct current voltage across a load 40, a full wave dry type rectifier 42 having input and output terminals is provided. In this instance, the input terminals are electrically connected across the capacitor 30, and the output terminals are electrically connected across the load 40, the voltage across which is substantially constant irrespective of the magnitude and frequency of the voltage across the input terminals 20 and 22.

Figure 3:
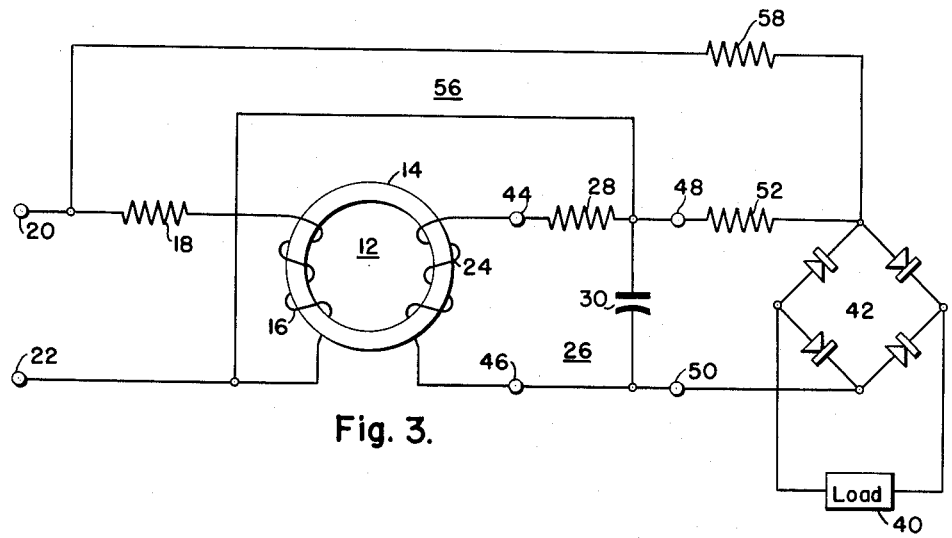
Fig. 3 is a schematic diagram of another embodiment of the teachings of this invention.

Referring to Fig. 3, there is illustrated another embodiment of the teachings of this invention. It is to be noted that like components of Figs. 1 and 3 have been given the same reference characters. However, in Fig. 3 the frequency sensitive network 26 comprises input terminals 44 and 46 and output terminals 48 and 50.

In order to obtain a voltage across the load 40 of Fig. 3 that is even more constant than the voltage across the load 40 of Fig. 1 irrespective of the magnitude and frequency of the voltage across the input terminals 20 and 22, a circuit 56 including resistance members 52 and 58 is electrically connected across the input terminals 20 and 22. As illustrated, the resistance member 52 is electrically connected between the output terminal 48 of the frequency sensitive network 26 and one of the input terminals of the rectifier 42. In particular, the terminal 22 is electrically connected to one side of the resistance member 52 and the terminal 20 is electrically connected to the other side of the resistance member 52 through the resistance member 58. When the circuit 56 is so connected, an alternating current voltage is produced across the resistance member 52 that is in phase opposition with the voltage across the resistance member 52 as produced by the saturating transformer 12 and the frequency sensitive network 26.

In operation, when voltage is applied to the input terminals 20 and 22, the core member 14 of the saturating transformer 12 almost completely saturates after a predetermined length of time. However, the core member 14 does not completely saturate. Therefore, assuming the voltage across the terminals 20 and 22 increases in magnitude, a small portion of this increase will appear across the secondary winding 24 of the saturating transformer 12 due to the fact that the core member 14 does not completely saturate. However, the voltage produced by the circuit 56 across the resistance member 52 is in phase opposition to the voltage across the resistance member 52 as produced by the saturating transformer 12 and the frequency sensitive network 26. Thus the slight increase in voltage across the secondary winding 24 as produced by the increase in voltage across the terminals 20 and 22 is compensated for by the voltage produced across the resistance member 52 by the circuit 56, to thus maintain the voltage across the load 40 substantially constant irrespective of the magnitude and frequency of the voltage across the terminals 20 and 22.

Assuming there is a decrease in the voltage across the input terminals 20 and 22, the circuit 56 will again produce a voltage across the resistance member 52 that is in phase opposition to the voltage across the resistance member 52 as produced by the saturating transformer 12 and the frequency sensitive network 26 to thus compensate for the error produced by the incomplete saturation of the core member 14. For instance, when the voltage across the terminals 20 and 22 decreases in magnitude, there is a slight decrease in the magnitude of the voltage across the secondary winding 24 which slight decrease is compensated for by the circuit 56, since it impresses a voltage of lesser magnitude across the resistance member 52. Thus, since the voltages across the resistance member 52 are in phase opposition and both voltages are decreased in magnitude, the voltage across the input terminals of the rectifier 42 and thus the voltage across the load 40 remains substantially constant.

Figure 4:
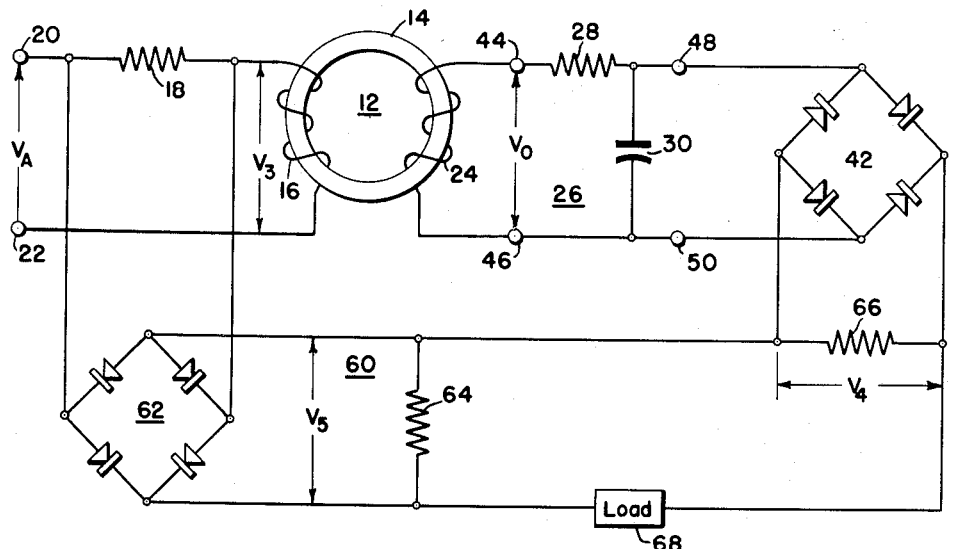
Fig. 4 is a schematic diagram of still another embodiment of the teachings of this invention.

Referring to Fig. 4 of the drawings, there is illustrated still another embodiment of the teachings of this invention in which like components of Figs. 3 and 4 are given the same reference characters. In the embodiment shown in Fig. 4, a compensating network 60 is provided in order to compensate for the error produced by the fact that the core member 14 of the saturating transformer 12 does not completely saturate. As illustrated, the compensating network 60 comprises a full wave dry type rectifier 62 having input and output terminals. In this instance, the input terminals of the rectifier 62 are electrically connected across the resistance member 18 to thereby produce a direct-current voltage across a resistance member 64, that is a measure of the input voltage across the input terminals 20 and 22. As illustrated, the resistance member 64 is electrically connected across the output terminals of the rectifier 62.

In order to produce a voltage which is substantially independent of the magnitude and frequency of the input voltage across the terminals 20 and 22, a resistance member 66, which is electrically connected to the output terminals of the rectifier 42 is electrically connected in series circuit relation with the resistance member 64 so that the voltage appearing across the resistance member 64 is in phase opposition with the voltage appearing across the resistance member 66. As can be seen from Fig. 4 of the drawing, the series circuit comprising the resistance members 64 and 66 is electrically connected across a load 68.

The voltage across the load 68 is substantially constant irrespective of the magnitude of the voltage across the input terminals 20 and 22, as represented by $V_a$. This can be better understood by considering that $$V_0 = k_1\omega + k_2 V_a$$

where $k_2 V_a$ represents the voltage error produced by the fact that the core member 14 does not completely saturate $$V_5 = k_3 \frac{V_a}{\omega}$$

$$V_4 = k_4 \frac{V_0}{\omega}$$

$$V_4 = k_4 \left( \frac{k_1\omega + k_2 V_a}{\omega} \right)$$

$$V_5 = k_3 \frac{V_a}{\omega}$$

$$V_4 - V_5 = k_4 k_1 + k_4 k_2 \frac{V_a}{\omega} - k_3 \frac{V_a}{\omega}$$

when $$k_3 = k_4 k_2$$

$$V_4 - V_5 = k_4 k_1 + k_4 k_2 \frac{V_a}{\omega} - k_4 k_2 \frac{V_a}{\omega}$$

$$V_4 - V_5 = k_4 k_1$$

Thus when $k_3$ is equal to $k_4$, the voltage across the load 68 is substantially constant irrespective of the magnitude of the voltage across the input terminals 20 and 22. It is, of course, to be understood that the values of $k_1$, $k_2$, $k_3$ and $k_4$ are determined on the basis of design principles which are within the scope of one skilled in the art.

In operation, assuming there is an increase in the voltage applied to the input terminals 20 and 22, a measure of this increased voltage will appear across the resistance member 64, which when combined with the slightly increased voltage across the resistance member 66 returns the voltage across the load 68 to the regulated value. On the other hand, assuming there is a decrease in the voltage applied to the terminals 20 and 22, a measure of this decreased voltage will appear across the resistance member 64, which when combined with the slightly decreased voltage across the resistance member 66, will return the voltage across the load 68 to the regulated value.

The apparatus embodying the teachings of this invention has several advantages. For instance, it comprises all static components which have an extremely long life, particularly when compared to electronic elements. In addition to comprising all static components the apparatus embodying the teachings of this invention maintains with a high degree of accuracy a substantially constant output voltage for the voltage reference network irrespective of the magnitude or frequency of its input voltage.

Since various changes can be made in the foregoing embodiments without departing from the spirit and scope of the present invention, it is understood that the subject matter set forth hereinbefore shall be interpreted as illustrative and not in a limiting sense.

I claim as my invention:

1. In a voltage reference device, the combination comprising, input terminals for receiving a voltage of variable frequency and magnitude, a saturating transformer comprising a magnetic core member, a primary winding disposed in inductive relation with the core member and electrically connected across the input terminals, the voltage impressed across the input terminals always being of sufficient magnitude to effect a substantially complete magnetic saturation of the core member, and a secondary winding so disposed in inductive relation with the core member that as the frequency of the voltage across the input terminals increases, the voltage across the secondary winding increases linearly, a frequency attenuation circuit having an input and an output, the frequency attenuation circuit being such that as the frequency of the voltage applied to its input increases the average voltage appearing at its output decreases linearly, and means for connecting the secondary winding to the input of the frequency attenuation circuit so that the output voltage of the frequency attenuation circuit is substantially independent of the frequency of the voltage across the input terminals of the voltage reference device.

2. In a voltage reference device, the combination comprising, input terminals for receiving a voltage of variable frequency and magnitude, a saturating transformer comprising a magnetic core member, a primary winding disposed in inductive relation with the core member and electrically connected in series circuit relation with a resistance member across the input terminals, the voltage impressed across the input terminals always being of sufficient magnitude to effect a substantially complete magnetic saturation of the core member, and a secondary winding so disposed in inductive relation with the core member that as the frequency of the voltage across the input terminals increases the voltage across the secondary winding increases linearly, a frequency attenuation circuit having an input and an output, the frequency attenuation circuit being such that as the frequency of the voltage applied to its input increases the average voltage appearing at its output decreases linearly, and means for connecting the secondary winding to the input of the frequency attenuation circuit so that the output voltage of the frequency attenuation circuit is substantially independent of the frequency of the voltage across the input terminals of the voltage reference device.

3. In a voltage reference device, the combination comprising, input terminals for receiving a voltage of variable frequency and magnitude, a saturating transformer comprising a magnetic core member, a primary winding disposed in inductive relation with the core member and electrically connected in series circuit relation with a resistance member across the input terminals, the voltage impressed across the input terminals always being of sufficient magnitude to effect a substantially complete magnetic saturation of the core member, and a secondary winding so disposed in inductive relation with the core member that as the frequency of the voltage across the input terminals increases the voltage across the secondary winding increases linearly, a frequency attenuation circuit having an input and an output and including a capacitor and a resistance member, the frequency attenuation circuit being such that as the frequency of the voltage applied to its input increases the average voltage appearing at its output decreases linearly, and means for connecting the secondary winding to the input of the frequency attenuation circuit so that the output voltage of the frequency attenuation circuit is substantially independent of the frequency of the voltage across the input terminals of the voltage reference device.

4. In a voltage reference device, the combination comprising, input terminals for receiving a voltage of variable frequency and magnitude, a saturating transformer comprising a magnetic core member, a primary winding disposed in inductive relation with the core member and electrically connected across the input terminals, the voltage impressed across the input terminals always being of sufficient magnitude to effect a substantially complete magnetic saturation of the core member, and a secondary winding so disposed in inductive relation with the core member that as the frequency of the voltage across the input terminals increases the voltage across the secondary winding increases, a frequency sensitive device having input and output terminals, the input terminals of the frequency sensitive device being connected in circuit relation with the secondary winding so that the frequency sensitive device can produce an output voltage which is substantially independent of the frequency of the voltage applied to the input terminals of the voltage reference device, a rectifier having input and output terminals, circuit means including a resistance member for connecting the output terminals of the frequency sensitive device in circuit relation with the input terminals of the rectifier, and another circuit means for applying a measure of the input voltage of the voltage reference device in phase opposition with the voltage across said resistance member, as produced by the output voltage of the frequency sensitive device, so that the voltage across the output terminals of the rectifier is substantially independent of the magnitude of the voltage applied to the input terminals of the voltage reference device.

5. In a voltage reference device, the combination comprising, input terminals for receiving a voltage of variable frequency and magnitude, a saturating transformer comprising a magnetic core member, a primary winding disposed in inductive relation with the core member and electrically connected in series circuit relation with a resistance member across the input terminals, the voltage impressed across the input terminals always being of sufficient magnitude to effect a substantially complete magnetic saturation of the core member, and a secondary winding so disposed in inductive relation with the core member that as the frequency of the voltage across the input terminals increases the voltage across the secondary winding increases, a frequency sensitive device having input and output terminals, the input terminals of the frequency sensitive device being connected in circuit relation with the secondary winding so that the frequency sensitive device produces an output voltage which is substantially independent of the frequency of the voltage applied to the input terminals of the voltage reference device, said frequency sensitive device comprising a capacitor and a resistance member connected in series circuit relation across the input terminals of the frequency sensitive device, the capacitor being connected across the output terminals of the frequency sensitive device, a rectifier having input and output terminals, circuit means including still another resistance member for connecting the output terminals of the frequency sensitive device in circuit relation with the input terminals of the rectifier, and another circuit means for applying a measure of the input voltage of the voltage reference device in phase opposition with the voltage across said still another resistance member, as produced by the output voltage of the frequency sensitive device, so that the voltage across the output terminals of the rectifier is substantially independent of the magnitude of the voltage applied to the input terminals of the voltage reference device.

6. In a voltage reference device, the combination comprising, input terminals for receiving a voltage of variable frequency and magnitude, a saturating transformer comprising a magnetic core member, a primary winding disposed in inductive relation with the core member and electrically connected in series circuit relation with a resistance member across the input terminals, the voltage impressed across the input terminals always being of sufficient magnitude to effect a substantially complete magnetic saturation of the core member, and a secondary winding so disposed in inductive relation with the core member that as the frequency of the voltage across the input terminals increases the voltage across the secondary winding increases, a frequency sensitive device having input and output terminals, the input terminals of the frequency sensitive device being connected in circuit relation with the secondary winding so that a voltage is produced at the output terminals of the frequency sensitive device which is substantially independent of the frequency of the voltage applied to the input terminals of the voltage reference device, a rectifier having input and output terminals, the input terminals of the rectifier being connected to said output terminals of the frequency sensitive device, another rectifier having input and output terminals, the input terminals of said another rectifier being connected across the resistance member, and circuit means for combining the voltage across the output terminals of said rectifier in phase opposition with the voltage across the output terminals of said another rectifier so as to produce a substantially constant output voltage for the voltage reference device.

References Cited in the file of this patent

UNITED STATES PATENTS

| | | |
|---|---|---|
| 1,904,096 | St. Clair | Apr. 18, 1933 |
| 2,326,465 | Keeler | Aug. 10, 1943 |
| 2,363,909 | Stewart et al. | Nov. 28, 1944 |